(12) United States Patent
Ioannidis et al.

(10) Patent No.: US 10,227,434 B2
(45) Date of Patent: Mar. 12, 2019

(54) TIN-FREE COMPOSITION FOR CROSSLINKING THERMOPLASTIC POLYOLEFINS

(71) Applicant: EVONIK DEGUSSA GmbH, Essen (DE)

(72) Inventors: Aristidis Ioannidis, Rheinfelden (DE); Ioana-Elena Mihailescu, Rheinfelden (DE); Bastian Bielawski, Rheinfelden (DE); Kerstin Weissenbach, Gengenbach (DE)

(73) Assignee: Evonik Degussa GmbH, Essen (DE)

( * ) Notice: Subject to any disclaimer, the term of this patent is extended or adjusted under 35 U.S.C. 154(b) by 216 days.

(21) Appl. No.: 14/913,236

(22) PCT Filed: Jul. 29, 2014

(86) PCT No.: PCT/EP2014/066264
§ 371 (c)(1),
(2) Date: Feb. 19, 2016

(87) PCT Pub. No.: WO2015/024742
PCT Pub. Date: Feb. 26, 2015

(65) Prior Publication Data
US 2016/0200852 A1  Jul. 14, 2016

(30) Foreign Application Priority Data
Aug. 21, 2013 (DE) .................. 10 2013 216 502

(51) Int. Cl.
*C08F 255/02* (2006.01)
*C08K 5/00* (2006.01)
*C08K 5/09* (2006.01)

(52) U.S. Cl.
CPC .......... *C08F 255/02* (2013.01); *C08K 5/0025* (2013.01); *C08K 5/09* (2013.01)

(58) Field of Classification Search
CPC ............................. C08L 23/06; C08K 5/5425
See application file for complete search history.

(56) References Cited

U.S. PATENT DOCUMENTS

| | | |
|---|---|---|
| 6,864,323 B2 | 3/2005 | Schlosser et al. |
| 9,108,992 B2 | 8/2015 | Weissenbach et al. |
| 9,273,186 B2 | 3/2016 | Standke et al. |
| 9,296,766 B2 | 3/2016 | Standke et al. |
| 2003/0114604 A1 | 6/2003 | Schlosser et al. |
| 2003/0162834 A1* | 8/2003 | Hirazawa ............... A61K 31/16 514/547 |
| 2011/0144278 A1 | 6/2011 | Weissenbach et al. |
| 2013/0253144 A1 | 9/2013 | Weissenbach et al. |

FOREIGN PATENT DOCUMENTS

| | | | |
|---|---|---|---|
| DE | 10 2008 041 918 A1 | | 3/2010 |
| EP | 426073 A2 | * | 5/1991 |
| EP | 1 288 235 A2 | | 3/2003 |
| EP | 1 288 235 A3 | | 3/2003 |
| JP | 2006052353 A | * | 2/2006 |

OTHER PUBLICATIONS

NIST Chemistry WebBook SRD 69 entry on octanoic acid (Year: 2017).*
International Search Report dated Nov. 3, 2014 in PCT/EP2014/066264.
U.S. Appl. No. 10/588,850, filed May 17, 2007, US 2008/0027161 A1, Schlosser, et al.
U.S. Appl. No. 13/058,290, filed Feb. 9, 2011, US 2011/0144277 A1, Weissenbach, et al.
U.S. Appl. No. 13/059,546, filed Feb. 17, 2011, US 2011/0144278 A1, Weissenbach, et al.
U.S. Appl. No. 13/903,594, filed May 28, 2013, US 2013/0253144 A1, Weissenbach, et al.
U.S. Appl. No. 13/062,225, filed May 16, 2011, US 2011/0282024 A1, Weissenbach, et al.
U.S. Appl. No. 13/061,451, filed Feb. 28, 2011, US 2012/0065302 A1, Weissenbach, et al.
U.S. Appl. No. 14/360,120, filed May 22, 2014, US 2014/0296555 A1, Standke, et al.
U.S. Appl. No. 14/912,710, filed Feb. 18, 2016, Ioannidis, et al.

* cited by examiner

*Primary Examiner* — Mark S Kaucher
(74) *Attorney, Agent, or Firm* — Grüneberg and Myers PLLC

(57) ABSTRACT

The invention relates to a composition for use in a Monosil process for the crosslinking of thermoplastic polyolefins which comprises
(i) from 5 to 60% by weight content of caprylic acid ($H_3C(CH_2)_6COOH$),
(ii) content of at least one monounsaturated organofunctional alkoxysilane of the general formula I $$A\text{-}SiR^2_x(OR^1)_{3-x} \qquad (I),$$

where $R^1$ is mutually independently a linear or branched hydrocarbon moiety having from 1 to 4 C atoms, $R^2$ is methyl and x is 0 or 1 and A is a monovalent olefin group of the formula $(R^3)_2C\!=\!C(R^3)\text{-}M_k\text{-}$, where k is 0 or 1, in which groups $R^3$ are identical or different and $R^3$ is a hydrogen atom or a methyl group and the group M is a group from this list: —$CH_2$—, —$(CH_2)_2$—, —$(CH_2)_3$— and $C(O)O$—$(CH_2)_3$—,
(iii) content of at least one free-radical generator and
(iv) optionally content of at least one other component, where the entirety of all components (i) to (iv) gives 100% by weight.
The present invention further relates to production processes and to mouldings or, respectively, products obtained therefrom, based on thermoplastic polyolefins, where a composition of the invention is reacted together with at least one thermoplastic polyolefin in a Monosil process. The invention further relates to the use of a composition of the invention in the Monosil process for the crosslinking of thermoplastic polyolefins during the production of products moulded by means of extrusion, based on thermoplastic polyolefins.

17 Claims, No Drawings

TIN-FREE COMPOSITION FOR CROSSLINKING THERMOPLASTIC POLYOLEFINS

This application is a National Stage entry under § 371 of international Application No. PCT/EP2014/066264, filed on Jul. 29, 2014, and which claims priority to German Application No. 10 2013 216 502.1, filed on Aug. 21, 2013.

The invention relates to a specific composition for use in a Monosil process for the crosslinking of thermoplastic polyolefins, where the composition comprises content of caprylic acid ($H_3C(CH_2)_6COOH$), content of at least one monounsaturated organofunctional alkoxysilane and content of at least one free-radical generator. The present invention further relates to a process for the production of silane-crosslinked mouldings or, respectively, products based on thermoplastic polyolefins with use of the selected composition in a Monosil process.

It is known that organotin compounds or aromatic sulphonic acids (Ambicat™ from *Borealis*) can be used as silanol-condensation catalysts for the crosslinking of silane-grafted or silane-copolymerized polyethylenes to produce filled and unfilled compounded polymer materials, in particular polyethylene (PE) and copolymers thereof.

An example of a method that can be used is the Sioplas process. This is a two-step process. The first step produces a compounded polymer material, and in essence here the thermoplastic polymer is grafted with addition of a mixture of a monounsaturated organoalkoxysilane, such as vinyltrialkoxysilane, and of a free-radical generator. A compounded polymer material thus obtained can be moulded in a second step with addition of a hydrolysis and condensation catalyst, generally an organotin compound, by means of extrusion to give a moulding, such as a pipe or a cable, and can then be crosslinked with exposure to moisture.

It is equally possible to produce a moulded product based on a thermoplastic polymer in a single-step process known as the Monosil process. The method here is in essence that the thermoplastic polymer is reacted in a heated screw-based extruder with addition of a mixture of a monounsaturated organoalkoxysilane, such as vinyltrialkoxysilane, of a free-radical generator and of a hydrolysis and condensation catalyst, such as an organotin compound, and is moulded, and the moulding is then crosslinked with exposure to moisture, for example in a water bath.

In both of the abovementioned processes it is possible to use further additions or additives, such as fillers, pigments, antioxidants, metal deactivators, UV stabilizers, colorant components, other processing aids or processing materials, for example monomeric organoalkoxysilanes or oligomeric alkyl- and/or vinyl-functional alkoxysiloxanes, for example as water scavengers or as what are known as "scorch retarders", an example being vinyltrimethoxysilane, vinyltriethoxysilane, octyltrimethoxysilane or octyltriethoxysilane or hexadecyltrimethoxysilane or hexadecyltriethoxysilane or octyl/methoxysiloxanes or octyl/ethoxysiloxanes or vinyl/methoxysiloxanes or vinyl/ethoxysiloxanes or octyl/vinyl/methoxysiloxanes or octyl/vinyl/ethoxysiloxanes, etc.

However, a disadvantage of the organotin compounds is that they are significantly toxic, while the sulphonic acids have a noticeable pungent odour which continues through all stages of the process into the final product. Because of by-products resulting from the reaction, the compounded polymer materials crosslinked with sulphonic acids are generally not suitable for use in the food sector or in the sector of drinking-water supply, for example for the production of drinking-water pipes. Conventional tin-containing silanol-condensation catalysts are dibutyltin dilaurate (DBTDL) and dioctyltin dilaurate (DOTL), which act as catalyst by way of their coordination sphere.

It is therefore known that moisture-crosslinkable polymers can be produced by grafting silanes onto polymer chains in the presence of free-radical generators and, after shaping, carrying out the moisture-crosslinking process in the presence of the silane-hydrolysis catalyst and/or silanol-condensation catalysts mentioned. Moisture-crosslinking of polymers with hydrolysable unsaturated silanes is used worldwide for the production of cables, pipes, foams, etc. Processes of this type are known under the names Sioplas process (DE 19 63 571 C3, DE 21 51 270 C3, U.S. Pat. No. 3,646,155) and Monosil process (DE 25 54 525 C3, U.S. Pat. No. 4,117,195). Whereas in the Monosil process the crosslinking catalyst is added in the first processing step, in the Sioplas process the addition of the crosslinking catalyst is delayed to the subsequent step. It is also possible to copolymerize vinyl-functional silanes together with the monomers and/or prepolymers directly to give the parent polymer, or to couple them to the polymer chains by what is known as grafting.

EP 207 627 A discloses further tin-comprising catalyst systems and thus modified copolymers based on the reaction of dibutyltin oxide with ethylene-acrylic acid copolymers. JP 58013613 uses $Sn(acetyl)_2$ as catalyst, and JP 05162237 teaches the use of tin carboxylates, zinc carboxylates or cobalt carboxylates together with bonded hydrocarbon groups as silanol-condensation catalysts, an example being dioctyltin maleate, monobutyltin oxide, dimethyloxybutyltin or dibutyltin diacetate. JP 3656545 uses zinc and aluminium soaps, for example zinc octylate and aluminium laurate for the crosslinking reaction. For the crosslinking of silanes, JP 1042509 likewise discloses the use of organotin compounds, but also alkyl titanates based on titanium-chelate compounds. JP 09-040713 discloses the production of polyolefins modified with silanes by means of reaction of a polyolefin and of two modified silane compounds with use of an organic acid as silanol-condensation catalyst.

WO 2010/028876 A1 is in essence directed to the metal-free, in particular tin-free, provision of thermoplastic products, and discloses very comprehensively a composition of a monounsaturated silane compound and of an organic acid, in particular saturated or unsaturated fatty acids, or of a compound that is a precursor of an organic acid and that liberates an acid, and processes for the production of compounded polymer materials, such as granulated materials and/or finished products, from thermoplastic parent polymers and/or from monomers and/or from prepolymer of the thermoplastic parent polymers with use of the composition, of the organic acid or of the compound that is a precursor and that liberates the said acid. WO 2010/028876 A1 moreover discloses the following materials thus produced, polymers, filled plastics, for example as granulate, finished product or moulding and/or items such as pipes or cables. A kit comprising a composition mentioned in that document is moreover disclosed. The said teaching is preferably directed to Sloplas processes, as can be seen from the Examples of WO 2010/028876 A1. Furthermore, butyric acid and caprylic acid are highlighted as unsuitable because of their pungent odour, in particular for drinking-water pipes. The person skilled in the art will also exclude shorter-chain carboxylic acids because of their corrosivity. According to the teaching of WO 2010/028876 A1 it is advantageous to use capric acid, lauric acid, myristic acid and behenic acid; in relation to myristic acid cf. also EP 2 465 897 B1.

The silane preparation used in the Monosil process, made of a monounsaturated organoalkoxysilane, of a free-radical generator and of a hydrolysis and condensation catalyst is subject to specific requirements imposed by users to the effect that the said silane preparation (for which the abbreviated term silane mixture or mixture or composition will be used below) is a homogeneous clear liquid and at what is considered to be a "winter" temperature for temperate latitudes, in particular in the frost-free region around 6° C., is a single-phase material, i.e. does not separate, and has a shelf life of 6 months at room temperature, and avoids any sedimentation or precipitation of components even when stored at relatively low temperatures. With regard to the ratios of materials used, moreover, the mixture in the Monosil process should have at least 3% by weight content of hydrolysis and condensation catalyst, so as to be able to ensure that crosslinking in the product is sufficient for a desired product quality.

It was an object of the present invention to find and provide a stable composition which is specifically suitable for the Monosil process and which comprises at least one monounsaturated organoalkoxysilane, at least one free-radical generator and at least one tin-free hydrolysis/crosslinking catalyst, in particular from the group of the organic acids, and which moreover complies with the requirements mentioned in relation to the Monosil process, so as to permit production of tin-free products based on thermoplastic polyolefins in a very easy and economic manner by the Monosil process, in particular for cable applications.

The object is achieved via the composition of the invention corresponding to the features of claim 1, the process of the invention with the features of claim 12, and the products of the invention corresponding to the features of patent claim 14, and also via the use according to claim 15. Preferred embodiments can be found in the dependent claims and in the description.

It has therefore been found, surprisingly, that specifically caprylic acid ($H_3C(CH_2)_6COOH$) is soluble at high proportions of up to 60% by weight in a monounsaturated organofunctional alkoxysilane, in particular in vinyltrimethoxysilane (VTMO), vinyltriethoxysilane (VTEO), and 3-methacryloxypropyltrimethoxysilane (MEMO), and that no sedimentation occurs in such a solution even when the storage temperature is 6° C. In contrast to this, the myristic acid highlighted as preferred in EP 2 465 897 B1 unfortunately exhibits considerable sedimentation at proportions of 7.8% by weight in vinyltrimethoxysilane at a storage temperature in the range of 6° C. Longer-chain carboxylic acids, inclusive of lauric acid and behenic acid are therefore likely to have solution characteristics that are at least as poor as, or are poorer than, those of myristic acid.

In contrast to capric acid, caprylic acid has the advantage that at room temperature (>16° C.) it is a liquid which can be handled very easily in everyday operations, preferably during conveying and metering. In contrast, capric acid, with a melting point of >31° C., would present complicated challenges to handling in everyday production operations. In order to ensure that capric acid could be metered as a liquid, it would have to be kept permanently liquid by heating, with high energy cost. This applies not only to the actual container but also to all feed lines and pumps which come into contact with capric acid. Another possibility would be addition of capric acid as solid. In that case, the dimensional stability of capric acid would have to be ensured by permanent cooling below the melting point. Again, this procedure for ensuring the flowability of the solid uses large quantities of energy and technical resources and is rather impracticable. By way of example, all of the conveying equipment would have to be permanently cooled and any failure of the cooling would lead to caking and blockages in the system.

Another difficulty is the solubility of capric acid in vinyltrimethoxysilane at low temperatures of about 1° C.; at these temperatures capric acid has limited solubility in vinyltrimethoxysilane, see Example 3D below. The partial precipitation that occurs in Example 3 below leads to demixing within the product packaging—usually drums or an IBC (intermediate bulk container). In order to prevent this demixing and ensure homogeneity of the mixture, the contents of the packaging would have to be stirred continuously during processing of the silane mixtures: an additional, not inconsiderable, cost in relation to capital expenditure and energy consumption which is not acceptable in the industrial Monosil process. In contrast to this, a mixture of 60% by weight of caprylic acid and 40% by weight of vinyltrimethoxysilane remains a clear solution even after 3.5 hours at 1° C., see Example 2A below.

The present compositions with content of monounsaturated organotrialkoxysilane, in particular vinyltrimethoxysilane or vinyltriethoxysilane (VTEO) or 3-methacryloxypropyltrimethoxysilane (MEMO), with up to 10% by weight content of free-radical generator and with up to 60% by weight content of capric acid remain a single-phase clear liquid even at 6° C.

On this basis, it was advantageously possible to provide compositions with (i) up to 60% by weight content of caprylic acid ($H_3C(CH_2)_6COOH$), (ii) content of at least one monounsaturated organofunctional alkoxysilane of the general formula I $$A\text{-SiR}^2_x(OR^1)_{3-x} \qquad (I),$$

where $R^1$ is mutually independently a linear or branched hydrocarbon moiety having from 1 to 4 C atoms, $R^2$ is methyl and x is 0 or 1 and A is a monovalent olefin group of the formula $(R^3)_2C=C(R^3)\text{-}M_k\text{-}$, where k is 0 or 1, in which groups $R^3$ are identical or different and $R^3$ is a hydrogen atom or a methyl group and the group M is a group from this list: —$CH_2$—, —$(CH_2)_2$—, —$(CH_2)_3$— and —C(O)O—$(CH_2)_3$—, (iii) content of at least one free-radical generator and (iv) optionally content of at least one other component, where the entirety of all components (i) to (iv) gives 100% by weight.

Experiments in which these compositions were used in the Monosil process for the production of tin-free products based on thermoplastic polyolefins have moreover advantageously proved that it is now also possible to realize industrially significant metering quantities of tin-free silane preparations in the Monosil process.

The invention therefore provides a composition for use in a Monosil process for the crosslinking of thermoplastic polyolefins, characterized in that the composition comprises (i) from 5 to 60% by weight content of caprylic acid ($H_3C(CH_2)_6COOH$), (ii) content of at least one monounsaturated organofunctional alkoxysilane of the general formula I $$A\text{-SiR}^2_x(OR^1)_{3-x} \qquad (I),$$

where $R^1$ is mutually independently a linear or branched hydrocarbon moiety having from 1 to 4 C atoms, $R^2$ is methyl and x is 0 or 1 and A is a monovalent olefin group of the formula $(R^3)_2C=C(R^3)\text{-}M_k\text{-}$, where k is 0 or 1, in which groups $R^3$ are identical or different and $R^3$ is a hydrogen atom or a methyl group and the group M is a group from this list: —$CH_2$—, —$(CH_2)_2$—, —$(CH_2)_3$— and —C(O)O—$(CH_2)_3$—, (iii) content of at least one free-radical generator and
(iv) optionally content of at least one other component, where the entirety of all components (i) to (iv) gives 100% by weight.

The content of caprylic acid as component (i) in a composition of the invention is preferably from 7 to 55% by weight, particularly preferably from 10 to 50% by weight, very particularly preferably from 15 to 45% by weight, in particular ≥20 to 40% by weight inclusive of all numerical values therebetween: just a few values that may be mentioned here in a list which is, however, not exclusive being 21, 22, 23, 24, 25, 26, 27, 28, 29, 30, 31, 32, 33, 34, 35, 36, 37, 38 and 39% by weight.

The content of component (ii) in a composition of the invention is moreover preferably from 15 to 94.95% by weight. For this it is preferable to select, from the list of the alkoxysilanes according to formula I, vinyltrimethoxysilane, vinyltriethoxysilane or 3-methacryloxypropyltrimethoxysilane as component (ii).

The free-radical generator as component (iii) in a composition of the invention is suitably an organic peroxide and/or an organic perester and advantageously selected from the following list: tert-butyl peroxypivalate, tart-butyl 2-ethylperoxyhexanoate, dicumyl peroxide, di-tert-butyl peroxide, tert-butyl cumyl peroxide, di(tert-butylperoxyisopropyl)benzene, 1,3-di(2-tert-butyl peroxyisopropyl)benzene, 1,4-di(2-tert-butylperoxyisopropyl)benzene, 2,5-dimethyl-2,5-bis(tert-butylperoxy)hex-3-yne, di-tert-amyl peroxide, 1,3,5-tris(2-tert-butylperoxy-isopropyl)benzene, 1-phenyl-1-tert-butylperoxyphthalide, alpha,alpha'-bis(tert-butylperoxy)diisopropylbenzene, 2,5-dimethyl-2,5-di-tert-butylperoxyhexane, 1,1-di(tert-butylperoxy)-3,3,5-trimethylcyclohexane, n-butyl 4,4-di(tert-butylperoxy) valerate, ethyl 3,3-di(tert-butylperoxy)butyrate, 3,3,6,9,9-hexamethyl-1,2,4,5-tetraoxacyclononane or a mixture of at least two of the abovementioned free-radical generators.

It is preferable that the content of component (iii) in a composition of the invention is from 0.05 to 10% by weight, particularly from 1 to 9% by weight.

The composition of the invention can moreover comprise, as component (iv), at least one additional substance and/or a mixture of these.

Component (iv) in a composition of the invention is therefore by way of example—but not exclusively—at least one additional substance from the following list: pentaerythrityl tetrakis[3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethylbenzyl)diphenylamine. N,N'-bis(3-(3,5-di-tert-butyl-4-hydroxyphenyl)propionyl)hydrazine, 6,6'-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'-methyl-4-hydroxy-5'-tert-butyl)phenyl-5-methyl) phenyl phosphite and 2,2,4-trimethyl-1,2-dihydroquinoline (polymerized).

The composition of the invention is generally used in liquid form. However, in some cases it is also advantageous—for still easier metering—to provide a composition of the invention on a solid carrier in a solid, flowable formulation, for example on an organic or inorganic carrier material. The carrier can be porous, particulate, swellable or optionally a foam. Particularly suitable carrier materials are polyolefins, such as PE, PP or polymer blends or inorganic or mineral materials, which can also advantageously have reinforcing, extending or flame-retardant properties. The carrier material can therefore also be at least one filler of the type conventionally used for filled thermoplastic polyolefin products, these being specified in more detail in the following: by way of example titanium dioxide ($TiO_2$), talc powder, clay, quartz, kaolin, aluminium hydroxide, magnesium hydroxide, bentonite, montmorillonite, mica (muscovite mica), calcium carbonate (chalk, dolomite), dyes, pigments, carbon black, $SiO_2$, precipitated silica, fumed silica, aluminium oxides, such as alpha- and/or gamma-aluminium oxide, aluminium oxide hydroxides, boehmite, baryte, barium sulphate, lime, silicates, aluminates, aluminium silicates and/or ZnO or a mixture of these.

Specific preferred carrier materials that may be mentioned are: ATH (aluminium trihydroxide, $Al(OH)_3$), magnesium hydroxide ($Mg(OH)_2$) or fumed silica, which is produced on an industrial scale by continuous hydrolysis of silicon tetrachloride in a hydrogen/oxygen flame. Fumed silica is an amorphous form of silicone dioxide which is a loose-textured, bluish powder. Particle size is usually in the region of a few nanometers, specific surface area is therefore large and is generally from 50 to 600 $m^2/g$. The uptake of the liquid composition of the invention here is in essence based on adsorption. Precipitated silicas are generally produced from sodium waterglass solutions by neutralization with inorganic acids under controlled conditions. After removal of the liquid phase, washing and drying, the crude product is finely ground, e.g. in steam-jet mills. Precipitated silica, too, is a substantially amorphous silicon dioxide, generally with a specific surface area of from 50 to 150 $m^2/g$. Calcium silicate is generally produced industrially by fusing quartz or kieselguhr with calcium carbonate or calcium oxide or by precipitation of aqueous sodium metasilicate solutions with water-soluble calcium compounds. The carefully dried product is generally porous and is capable of uptake of up to five times its quantity by weight of water or oils. The various commercially available forms of carbon black are equally suitable as carrier material, for example for the production of black cable sheathing.

Inorganic carrier materials suitably have a certain porosity, for example about 10% by volume. Uptake of a composition of the invention can therefore be achieved not only by surface adsorption but also by absorption within the pores.

Porous polyolefins, such as polyethylene (PE) or polypropylene (PP) and copolymers, such as ethylene copolymers with low-carbon alkenes, such as propene, butene, hexene, octene or ethylene vinyl acetate (EVA), are produced by specific polymerization techniques and polymerization processes. Particle sizes are generally from 3 to <1 mm, and porosity can be above 50% by volume.

Solid carrier materials can bear, on their surfaces, groups which can react with the alkoxy groups of the unsaturated organosilane/organosilane mixtures. A possible result here is that the silicon atom with the functional group bonded thereto becomes chemically fixed on the surface. These groups on the surface of the filler are in particular hydroxy groups. Accordingly, preferred fillers are metal hydroxides having a stoichiometric proportion, or, in their various dehydration stages, a substoichiometric proportion, of hydroxy groups, extending as far as oxides having comparatively few residual hydroxy groups, where these groups however are detectable by DRIFT IR spectroscopy. Examples of suitable fillers are aluminium trihydroxide (ATH), aluminium oxide hydroxide (AlOOH.aq), magnesium dihydroxide (MDH), brucite, huntite, hydromagnesite, mica and montmorillonite. Other fillers that can be used are calcium carbonate, talc powder and glass fibres. It is moreover also possible to use what are known as "char formers", such as ammonium polyphosphate, stannates, borates, talc, or materials of this type in combination with other fillers. It is preferable that the said carrier materials or the said fillers are pulverulent, particular, porous, or swellable or optionally are foams.

Particularly preferred carrier materials are therefore porous polyolefins, such as PE, PP, or polymer blends, porous aluminium hydroxides, magnesium hydroxides, fumed silica, precipitated silica and porous silicates.

In accordance with other preferred embodiments, a composition for the purposes of the present invention can also comprise a selection of components (i), (ii) and (iii) and at least one other component (iv) selected from the following list: additional substances, such as antioxidants, stabilizers, such as metal deactivators and UV stabilizers, and other processing aids or processing substances and/or mixtures of these.

In one particularly preferred embodiment, a composition of the invention comprises
(i) from 7 to 50% by weight of caprylic acid,
(ii) from 15 to 90% by weight of vinyltrimethoxysilane or vinyltriethoxysilane or 3-methacryloxypropyltrimethoxysilane,
(iii) from 3 to 10% by weight of dicumyl peroxide and
(iv) optionally a total of from 0.05 to 15% by weight of at least one additional substance or of a plurality of additional substances,
where the entirety of all of components (i) to (iv) gives 100% by weight.

A composition of the invention can therefore advantageously comprise, as further component (iv), from 0 to 15% by weight of a metal deactivator or stabilizer from the following list: pentaerythrityl tetrakis[3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethylbenzyl)diphenylamine, N,N'-bis(3-(3,5-di-tert-butyl-4-hydroxyphenyl)propionyl)-hydrazine, 6,6-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'-methyl-4-hydroxy-5'-tert-butyl)phenyl-5-methyl)phenyl phosphite and 2,2,4-trimethyl-1,2-dihydroquinoline (polymerized), where the entirety of all components (i) to (iv) gives 100% by weight.

Furthermore, a said composition of the invention can also be provided on a carrier (another term used for which above and hereinafter being carrier material), where the proportion of the composition of the invention, based on the carrier, can advantageously be from 10 to 50% by weight and the carrier is selected from the following list: thermoplastic polyolefins and inorganic carrier materials as mentioned above.

A composition of the invention can suitably be produced by weighing-out of components (i) to (iii) and optionally (iv), to the extent that component (iv) is entirely soluble in the preparation made of components (i), (ii) and (iii), charging these to a suitably inert stirred tank, and preferably mixing at room temperature. A list—which is not, however, exclusive—of the examples of materials of which containers, stirrers and articles in contact with the mixture can be made is as follows: quartz glass, enameled steel or peroxide-resistant steel or plastic. Compositions of the invention thus obtained are generally homogeneous clear single-phase mobile liquids.

However, a composition of the invention thus obtainable in a simple and economic manner can also be applied to a carrier material or absorbed into a porous, absorbent carrier material, for example by immersion or impregnation: once the saturated carrier has been drip-dried, for example by way of a sieve, the composition of the invention can also be provided in a homogeneous flowable and easily weighable and easily meterable solid form on a carrier.

Compositions of the invention are advantageously suitable for use in a Monosil process with thermoplastic polyolefins.

The present invention therefore also provides a process for the production of products based on thermoplastic polyolefins, by reacting a composition of the invention together with at least one thermoplastic polyolefin in a Monosil process.

In a suitable method for carrying out the Monosil process of the invention, at least one thermoplastic polyolefin and one composition of the invention and also optionally other additions, are metered into a heated screw-based extruder, the molten mixture is heated therein, the melt is conveyed and extruded by way of a die, the extrudate is passed into a water bath for crosslinking and the extrudate is permitted to react until dimensional stability is achieved and then the resultant moulding is dried.

Preferred thermoplastic polyolefins for the purpose of the invention are polyethylene (PE) and polypropylene (PP), in particular the following grades: LLPE, LDPE, LLDPE, VLDPE, MDPE, HDPE, m-PE and mixtures of at least two of the abovementioned polyolefins.

It is therefore possible to use the Monosil process of the invention to achieve advantageous production of the following in the form of mouldings or items that are free from tin, with high quality: path cables for the low-voltage and medium-voltage sector, cables for the solar-energy sector, flame-retardant thermoplastic and crosslinked cables, cables for underwater applications, safety cables for the mining sector, and in the transport sector (e.g. tramway systems, underground railway systems, airports), marine cables, cables in the oil-production sector or in the mining sector, automobile cables, and (tele)communication cables. The process of the invention can also be used advantageously for peripheral applications, for example shrink sleeves for cable installation.

The present invention therefore also provides mouldings or products, in particular abovementioned cables, obtainable by the process of the invention.

The present invention also provides the use of a composition of the invention in a Monosil process for the crosslinking of thermoplastic polyolefins during the production of products moulded by means of extrusion, based on thermoplastic polyolefins, in particular said cables, where these can be unfilled products or products filled with fillers and/or products coloured by means of dyes or by means of pigments.

Among all of the organic acids known in the prior art, it is therefore clearly advantageous to select specifically caprylic acid as hydrolysis and crosslinking catalyst in "silane preparations" or compositions of the invention for use in the Monosil process for the provision of tin-free products based on thermoplastic polyolefins, in particular for cable applications.

The examples below illustrate the present invention without restricting the subject matter:

EXAMPLES

Definitions
pts=parts
This unit always means the proportion (parts by weight) of the respective additive, based on 100 pts of polymer—in this study by way of example polyethylene (PE). By way of example, 1.4 pts of a silane mixture are added to 100 pts of PE. After conversion to percent this then gives: 1.4 pts of silane mixture/(100 pts of PE+1.4 pts of silane mixture)×100=1.38% of silane mixture in the entire compounded polymer material.

h=hour(s)

% by wt.=percent by weight

Roller-bed Application

In this process, plastics granulate heated—for 1 h at 70° C. in a convection oven—is charged to a round-bottomed plastics flask. The silane mixture needed for the experiment is then added onto the heated plastics granulate and the flask is placed on a roller bed. The round-bottomed flask is then rotated around its longitudinal axis for 1 h and the entire content of the plastics flask is thus mixed. The heated plastic absorbs the silane mixture, and after 1 h the result is a dry flowable plastics granulate which comprises the silane mixture in the necessary or planned ratio.

Tensile Specimen/Test Specimen/Sample for Testing/Test Sample

This is a sample for testing which is punched out by means of a punching apparatus from an extruded strip (moulding). The selected shape of the tensile specimen for testing is such that the width of the specimen is considerably greater at the external ends than in the narrowed central portion. This permits defined loading in the central portion of the specimen in order to ensure that the measurements are reproducible. The hot-set/permanent-set measurement markings are applied in the said central, narrowed region. Calculation of the required loading weight uses the cross-sectional are a (width×thickness) of the narrowed central portion, since maximal loading occurs here. The test samples used in the experiments were of type 5A, in accordance with DIN EN ISO 527-2:2012-06 page 10.

Hot Set

In a drying cabinet with natural ventilation, a tensile specimen is exposed to defined mechanical loading (0.2 MPa, 15 min at 200° C.), and the resultant change in length of the test specimen was determined. The loading weight required for a rectangular tensile-specimen cross section and for a prescribed loading of 0.2 MPa is calculated as follows: loading weight [g]=20.387×tensile-specimen width [mm]×tensile-specimen thickness [mm](width and thickness being measured in each case in the narrowed region of the tensile specimen).

The calculated weight is suspended on the appropriate test specimen and the entire arrangement is fixed in the convection oven at 200° C. The test specimen is previously marked with two markings (20 mm apart). After 15 minutes, the distance between the marks is measured. The hot set is the thermal expansion of the loaded tensile specimens after 15 minutes at 200° C. with loading of 0.2 MPa. The hot set is calculated in the following way:

$$\text{hot set} = (L_{HS} - 20 \text{ mm})/20 \text{ mm} * 100 [\%].$$

$L_{HS}$ here is the distance between the markings in mm after the 15 min at 200° C. with loading of 0.2 MPa. Hot set values 100% correspond to adequately good crosslinking.

Permanent Set

After determination of the change in distance between the markings on the loaded specimen after 15 minutes at 200° C. with loading of 0.2 MPa in the drying oven, i.e. directly after the determination of hot set, the weights are removed from the tensile specimens, and the tensile specimens are retained for a further 5 minutes in the oven at 200° C., with no loading. After five minutes, the tensile specimens are removed and are allowed to cool for 5 minutes at ambient temperature. The distance between the markings is then again measured. The permanent set is the residual expansion indicated by the marking on the crosslinked tensile specimens. The permanent set is calculated in the following way:

$$\text{permanent set} = (L_{PS} - 20 \text{ mm})/20 \text{ mm} * 100.$$

$L_{PS}$ here is the distance between the markings on the tensile specimen after the test specimen had been retained for 5 min at 200° C., with no loading, and finally then had been cooled at RT for 5 min. Permanent set values ≤25% correspond to adequately good crosslinking.

Carboxylic Acids

Caprylic acid=octanoic acid, $H_3C(CH_2)_6COOH$
Capric acid=decanoic acid, $H_3C(CH_2)_8COOH$
Lauric acid=dodecanoic acid, $H_3C(CH_2)_{10}COOH$
Myristic acid=tetradecanoic acid, $H_3C(CH_2)_{12}COOH$ Experiments below have shown that, in order to provide a particularly suitable embodiment of a composition of the invention for the Monosil process, a preferred proportion of caprylic acid in the said silane mixture is >20% by weight, with a view to establishing the range of degree of crosslinking specified in the cable sector.

With myristic acid as catalyst component it is not possible to produce stable silane mixtures for the Monosil process, because of low solubility or very rapid precipitation at low temperatures. Surprisingly, in contrast, caprylic acid has good suitability for use in these silane mixtures, since very large proportions by weight, in particular even up to 60% by weight, of caprylic acid are soluble without difficulty in VTMO, and these compositions do not lead to any precipitation or demixing even at low temperatures.

Example 1

Solution Experiments with Caprylic and Myristic Acid in Vinyltrimethoxysilane

In each case, 50 g of vinyltrimethoxysilane (VTMO) were used as initial charge in a clear 100 ml glass flask. The catalysts in the form of the organic acids were then added stepwise to the silane, and the respective flask was shaken manually until a clear liquid had been obtained. The silane compositions were then stored at +6° C. in a refrigerator and removed from time to time for inspection. Table 1 lists the details and the results.

TABLE 1

Overview of solution study using myristic acid and caprylic acid in vinyltrimethoxysilane

|  | Example 1A (Comparative Example) Myristic acid in 50.08 g of VTMO | Example 1B Caprylic acid in 50.05 g of VTMO |
|---|---|---|
| Addition 1 at room temperature: about 26° C. | Quantity added 3.5 g, clear liquid, vigorous shaking required | Quantity added 33.59 g clear liquid, readily soluble, no complicated mixing |
| Addition 2 at room temperature: about 26° C. | Further quantity added 0.29 g, clear liquid, vigorous shaking required | No change |
| Overnight in chamber under controlled conditions at about 23° C. | Flasks were stored for 17.1 hours in a chamber under controlled conditions at about 23° C. The specimens then still had the same clarity. | |
| Addition 3 - chamber under controlled conditions: about 23° C. | Further quantity added 0.5 g, clear liquid, vigorous shaking required | No change |

TABLE 1-continued

Overview of solution study using myristic acid and caprylic acid in vinyltrimethoxysilane

|  | Example 1A (Comparative Example) Myristic acid in 50.08 g of VTMO | Example 1B Caprylic acid in 50.05 g of VTMO |
|---|---|---|
| Storage in refrigerator at about 6° C. | Severe precipitation after 50 minutes | No change, clear single-phase liquid |
| Percentage proportion of catalyst component in VTMO | 7.8% by weight | 40.2% by weight |

Result of Example 1

After 1 h at 6° C., myristic acid precipitates at a concentration of 7.8% by weight in VTMO. The mixture with 40.2% by weight of caprylic acid in vinyltrimethoxysilane remained clear at 6° C.

Example 2

Solution Experiments Using Caprylic Acid in Unsaturated Alkoxysilanes

In each case, 4 g of an unsaturated alkoxysilane—vinyltrimethoxysilane (VTMO), vinyltriethoxysilane (VTEO), 3-methacryloxypropyltrimethoxysilane (MEMO)-was charged with 6 g of caprylic acid to a 20 ml clear glass flask, and mixed by shaking. The flasks were then stored at 1° C., and the liquids were assessed after 3.5 h.

TABLE 2

Overview of results of solution studies using caprylic acid in various unsaturated alkoxysilanes

| Starting materials | Example 2A | | Example 2B | | Example 2C | |
|---|---|---|---|---|---|---|
| Vinyltrimethoxysilane (VTMO) | 4 g | 40% by weight | — | — | — | — |
| Vinyltriethoxysilane (VTEO) | — | — | 4 g | 40% by weight | — | — |
| 3-Methacryloxypropyltrimethoxysilane (MEMO) | — | — | — | — | 4 g | 40% by weight |
| Caprylic acid | 6 g | 60% by weight | 6 g | 60% by weight | 4 g | 60% by weight |
| After 1.5 h at 6° C. | Clear solution | | Clear solution | | Clear solution | |
| After 3.5 h at 1° C. | Clear solution | | Clear solution | | Clear solution | |

Result of Example 2

The liquids mixed immediately. The mixtures were clear even after 3.5 h at 1° C. Table 2 presents the results.

Example 3 (Comparative Example)

Solution Studies Using Capric Acid in Vinyltrimethoxysilane

Mixtures of vinyltrimethoxysilane and capric acid in various ratios were prepared. The mixtures were produced in 20 ml clear glass flasks. Mixing was continued until a stable solution had been obtained. Flasks were then stored at 1° C., and the liquids were assessed after 2 h and 3.5 h.

TABLE 3

Results of mixture studies using capric acid in vinyltrimethoxysilane

| Starting materials | Example 3A | | Example 3B | | Example 3C | | Example 3D | |
|---|---|---|---|---|---|---|---|---|
| Vinyltrimethoxysilane (VTMO) | 9 g | 90% by weight | 8.5 g | 85% by weight | 8 g | 80% by weight | 7.5 g | 75% by weight |
| Capric acid | 1 g | 10% by weight | 1.5 g | 15% by weight | 2 g | 20% by weight | 2.5 g | 25% by weight |
| After 2 h at 1° C. | Clear solution | | Clear solution | | Clear solution | | Precipitation, redissolves at room temperature | |
| After 3.5 h at 1° C. | Clear solution | | Clear solution | | Clear solution | | Precipitation, redissolves at room temperature | |

Result of Example 3

Capric acid initially dissolved in the silane. After 2 h and 3.5 h at 1° C., the mixtures remained clear up to and inclusive of 20% by weight of capric acid. However, at higher concentrations precipitation occurred.

Example 4

Solution Studies Using Mixtures with Various Unsaturated Alkoxysilanes, Peroxides, Additives and Caprylic Acid Silane mixtures were produced with various additives in 20 ml of clear glass flasks. The starting materials were mixed (magnet stirrer, about 1 h at room temperature) until a stable solution was obtained. The flasks were then stored at 1° C., and the liquids were assessed after 3.5 h. Table 4-1 lists the three mixtures. Table 4-2 presents the results of the studies.

TABLE 4-1

Mixtures with various unsaturated alkoxysilanes, peroxides, additives and caprylic acid

| Starting materials | Example 4A | | Example 4B | | Example 4C | |
|---|---|---|---|---|---|---|
| Vinyltrimethoxysilane (VTMO) | 5 g | 50% by weight | — | — | — | — |
| Vinyltriethoxysilane (VTEO) | — | — | 1.5 g | 15% by weight | — | — |
| 3-Methacryloxypropyltrimethoxysilane (MEMO) | — | — | — | — | 4.5 g | 45% by weight |
| Dicumyl peroxide | 1 g | 10% by weight | — | — | — | — |
| 2,5-Dimethyl-2,5-di(tert-butylperoxy)-hexane | — | — | — | — | 1 g | 10% by weight |
| Di(tert-butylperoxyisopropyl)benzene | — | — | 1 g | 10% by weight | — | — |
| 2,6-Di-tert-butyl-4-methylphenol | 1.5 | 15% by weight | — | — | — | — |
| Pentaerythrityl tetrakis[3-(3,5-bis(1,1-dimethylethyl)-4-hydroxyphenyl)-propionate] | — | — | — | — | 0.25 g | 2.5% by weight |
| 4,4-Bis(1,1-dimethylbenzyl)diphenylamine | — | — | — | — | 0.5 g | 5% by weight |
| Tris(2-tert-butyl-4-thio(2'-methyl-4-hydroxy-5'-tert-butyl)phenyl-5-methyl)phenyl phosphite | — | — | — | — | 0.25 g | 2.5% by weight |
| 2,2,4-Trimethyl-1,2-dihydroquinoline, polymerized (TMQ) | — | — | 1.5 g | 15% by weight | — | — |
| Caprylic acid | 2.5 | 25% by weight | 6 g | 60% by weight | 3.5 g | 35% |

TABLE 4-2

Results of mixture studies with various unsaturated alkoxysilanes, peroxides, additives and caprylic acid

| Starting materials | Example 4A | Example 4B | Example 4C |
|---|---|---|---|
| Prior to storage | Clear solution | Brown solution | Clear solution |
| After 3.5 h at 1° C. | Clear solution | Brown solution | Clear solution |

Result of Example 4

All of the contents of the flasks were clear even after 3.5 h at 1° C., irrespective of the combination of materials selected. It should be noted that the mixture with TMQ always gives a red-brown solution.

Example 5(Comparative Example)

Silane Crosslinking of LLDPE with Myristic Acid and DBTL as Catalysts

LLDPE was reacted and moulded with mixtures based on vinyltrimethoxysilane, dicumyl peroxide and a crosslinking catalyst by means of a heatable screw-based extruder, and then crosslinked with exposure to moisture. Table 5-1 lists the two silane mixtures.

TABLE 5-1

Silane composition for the extrusion study

| | Example 5A | Example 5B |
|---|---|---|
| Vinyltrimethoxysilane | 87.6% by weight | 84.4% by weight |
| Dicumyl peroxide | 7.9% by weight | 7.6% by weight |
| 2,6-Di-tert-butyl-4-methylphenol | 1.0% by weight | |
| Dibutyltin dilaurate (DBTL) | 3.5% by weight | — |
| Myristic acid | — | 7.0% by weight |

The extrusion process was achieved in a twin-screw extruder (ZE25, Berstorff) with lid ratio 33 and with screw diameter d=25 mm. The silane mixtures were applied on a roller bed for a period of about 1 h to the polyethylene (LLDPE, LL 4004 EL, ExxonMobil Chemical). Prior to the said application process, the PE had been heated for about 1 h at about 70° C. The temperature profile for the extrusion process was as follows, at a rotation rate of 100 rpm:

–/150/160/200/200/210/210/210° C. A strip was extruded. The strips were crosslinked in a water bath at 80° C. for 6 h. Prior to measurement of hot set and permanent set, the crosslinked test samples were dried at 100° C. for 1 h.

Table 5-2 lists the results relating to the extrusion processes for Example 5:

TABLE 5-2

Results of crosslinking studies on specimens with myristic acid and DBTL as catalysts.

| | Hot set [%] 0.2 MPa, 15 min@200° C. | | Permanent set [%] 5 min@200° C., 5 min@RT | |
|---|---|---|---|---|
| | 1.4 pts | 1.6 pts | 1.4 pts | 1.6 pts phr |
| DBTL specimen (Example 5A) | 48 | 38 | 5 | 0 |
| Myristic acid specimen (Example 5B) | fractured | fractured | — | — |

Result of Example 5

The proportion of 7% by weight of myristic acid in the silane mixture is not adequate to achieve a crosslinking density comparable with the prior art (DBTL).

Example 6

Silane Crosslinking of LLDPE with Caprylic Acid as Catalyst in Comparison with DBTL as Catalyst Studies were carried out in which the proportion of caprylic acid in the silane mixtures was varied. Table 6-1 lists the compositions of the mixtures studied.

TABLE 6-1

Mixtures for the experiments with caprylic acid in comparison with DBTL as catalyst

| | Example 6A (Comparative Example) | Example 6A | Example 6C | Example 6D |
|---|---|---|---|---|
| Vinyltrimethoxysilane (VTMO) | 87.6% by weight | 81.1% by weight | 82.8% by weight | 68.2% by weight |
| Dicumyl peroxide | 7.9% by weight | 7.9% by weight | 7.2% by weight | 6.4% by weight |
| 2,6-Di-tert-butyl-4-methylphenol | 1.0% by weight | 1.0% by weight | 0.9% by weight | 0.4% by weight |
| Dibutyltin dilaurate (DBTL) | 3.5% by weight | — | — | — |
| Caprylic acid | — | 10% by weight | 9.1% by weight | 25% by weight |

The extrusion process was achieved in a twin-screw extruder (ZE25, Berstorff) with l/d ratio 33 and with screw diameter d=25 mm. The silane mixtures were applied on a roller bed for a period of about 1 h to the polyethylene (LLDPE, LL 4004 EL, ExxonMobil Chemical). Prior to the said application process, the PE had been heated for about 1 h at about 70° C.

The temperature profile for the extrusion process was as follows, at a rotation rate of 100 rpm:
–/150/160/200/200/210/210/210° C.

A strip was extruded. The strips were crosslinked in a water bath at 80° C. for 6 h. Prior to measurement of hot set and permanent set, the crosslinked test samples were dried at 100° C. for 1 h.

Table 6-2 lists the results from the studies of the crosslinked and dried extrudates:

TABLE 6-2

Overview of crosslinking study with caprylic acid as crosslinking catalyst in comparison with DBTL as catalyst

| Silane mixture | 1.4 pts | 1.6 pts | 1.8 pts | 2.0 pts |
|---|---|---|---|---|
| | Hot set of crosslinked specimens (6 h@80° C.; 200° C., 15 min) | | | |
| Example 6A 3.5% of DBTL | 48% | 38% | — | — |
| Example 6B 10% of caprylic acid | 263% | 158% | — | — |
| Example 6C 9.1% of caprylic acid | 168% | 108% | — | — |
| Example 6D 25% of caprylic acid | — | 85% | 82% | 68% |
| | Permanent set of crosslinked specimens (5 min at 200° C. with no loading, 5 min at RT with loading) | | | |
| Example 6A 3.5% of DBTL | 5% | 0% | — | — |
| Example 6B 10% of caprylic acid | 50% | 33% | — | — |
| Example 6C 9.1% of caprylic acid | 28% | 20% | — | — |
| Example 6D 25% of caprylic acid | — | 21% | 15% | 13% |

Result of Example 6

For crosslinking in a specification range useful for the cable industry, preference is advantageously given to quantities of caprylic acid >20 percent by weight in the silane mixtures. With sparingly soluble fatty acids such as myristic acid it is therefore not possible to obtain any industrially useful silane mixture for the Monosil process. Test samples of the invention produced with use of a caprylic-acid-containing composition are moreover surprising in that, contrary to the previous experience available by way of example in WO 2010/028876 A1, they have a relatively unconspicuous odour, i.e. the extrudate (strips) do not have any unpleasantly pungent odour.

It is therefore clearly and advantageously preferable to select caprylic acid as catalyst in silane preparations and, respectively, in compositions for the Monosil process to the production of tin-free products based on thermoplastic polyolefins, in particular for cable applications.

The invention claimed is:

1. A composition, comprising:
   (i) from 5 to 60% by weight content of caprylic acid $(H_3C(CH_2)_6COOH)$;

(ii) a monounsaturated organofunctional alkoxysilane of formula I $$A\text{-}SiR^2_x(OR^1)_{3-x} \qquad (I),$$

wherein

R$^1$ is independently a linear or branched hydrocarbon moiety having from 1 to 4 C atoms, R$^2$ is methyl and x is 0 or 1, and A is a monovalent olefin group of formula $(R^3)_2C=C(R^3)\text{-}M_k\text{-}$, where k is 0 or 1, in which groups R$^3$ are identical or different and R$^3$ is a hydrogen atom or a methyl group and the group M is a group selected from the group consisting of —CH$_2$—, —(CH$_2$)$_2$—, —(CH$_2$)$_3$— and —C(O)O—(CH$_2$)$_3$—;

(iii) a free-radical generator; and (iv) optionally at least one other component, where the entirety of all components (i) to (iv) totals 100% by weight.

2. The composition according to claim 1, wherein the content of caprylic acid as component (i) is >20 to 50% by weight.

3. The composition according to claim 1, wherein the content of component (ii) is from 15 to 94.95% by weight.

4. The composition according to claim 1, wherein the content of component (iii) is from 0.05 to 10% by weight.

5. The composition according to claim 4, wherein the free-radical generator component (iii) is an organic peroxide and/or an organic perester, selected from the group consisting of tert-butyl pexroxypivalate, tert-butyl 2-ethylperoxyhexanoate, dicumyl peroxide, di-tert-butyl peroxide, tert-butyl cumyl peroxide, di(tert-butylperoxyisopropyl)benzene, 1,3-di(2-tert-butylperoxyisopropyl)benzene, 1,4-di(2-tert-butylperoxyisopropyl)benzene, 2,5-dimethyl- 2,5-bis(tert-butylperoxy)hex-3-yne, di-tert-amyl peroxide, 1,3,5-tris(2-tert-butylperoxyisopropyl)benzene, 1-phenyl-1-tert-butylperoxyphthalide, alpha,alpha'-bis(tert-butylperoxy)diisopropylbenzene, 2,5-dimethyl-2,5-di-tert-butylperoxyhexane, 1,1-di(tert-butylperoxy)-3,3,5-trimethylcyclohexane, n-butyl 4,4-di(tert-butylperoxy)valerate, ethyl 3,3-di(tert-butylperoxy)butyrate, 3,3,6,9,9-hexamethyl-1,2,4,5-tetraoxacyclononane and a mixture thereof.

6. The composition according to claim 1, wherein the composition comprises, as component (iv), at least one additional substance.

7. The composition according to claim 6, wherein the composition comprises, as component (iv), at least one additional substance selected from the group consisting of pentaerythrityltetrakis[3-(3,5-bis(1,1-dimethylethyl)-4-hydroxyphenyl) propionate], 2,6-di-tert-butyl-4-methylphenol, octadecyl 3-(3,5-di-tert-butyl-4-hydroxyphenyl) propionate, 4,4'-bis(1,1-dimethylbenzyl)diphenylamine, N,N'-bis(3-(3,5-di-tert-butyl-4-hydroxyphenyl)propionyl)hydrazine, 6,6'-di-tert-butyl-2,2'-thiodi-p-cresol, 1,3,5-trimethyl-2,4,6-tris(3,5-di-tert-butyl-4-hydroxybenzyl)benzene, tris(2-tert-butyl-4-thio(2'-methyl-4-hydroxy-5'-tert-butyl)phenyl-5-methyl)phenyl phosphite and 2,2,4-trimethyl-1,2-dihydroquinoline (polymerized).

8. The composition according to claim 1, wherein component (ii) is selected from the group consisting of vinyltrimethoxysilane, vinyltriethoxysilane and 3-methacryloxytrimethoxysilane.

9. The composition according to claim 1, wherein the composition comprises (i) from 7 to 50% by weight of caprylic acid, (ii) from 15 to 90% by weight of vinyltrimethoxysilane or vinyltriethoxysilane or 3-methacryloxypropyltrimethoxysilane, (iii) from 3 to 10% by weight of dicumyl peroxide and (iv) optionally a total of from 0.05 to 15% by weight of at least one additional substance or of a plurality of additional substances, wherein the entirety of all of components (i) to (iv) totals 100% by weight.

10. The composition according to claim 1, wherein the composition comprises, as one other component (iv), from 0 to 15% by weight of a stabilizer or metal deactivator selected from the group consisting of pentaerythrityl tetrakis[3-(3,5-bis(1,1-dimethylethyl)-4-hydroxyphenyl)propionate], 2,6-di-tert-butyl-4-methylphenol, octadecyl 3-(3,5-di-tert-butyl-4-hydroxyphenyl)propionate, 4,4'-bis(1,1-dimethylbenzyl)diphenylamine, N,N'-bis(3-(3,5-di-tert-butyl-4-hydroxyphenyl)propionyphydrazine, 6,6'-di-tert-butyl-2,2'-thiodi-p-cresol, 1,3,5-trimethyl-2,4,6-tris(3,5-di-tert-butyl-4-hydroxybenzyl)benzene, tris-(2-tert-butyl-4-thio(2'-methyl-4-hydroxy-5'-tert-butyl)phenyl-5-methyl)phenyl phosphite and 2,2,4-trimethyl-1,2-dihydroquinoline (polymerized), where wherein the entirety of all components (i) to (iv) totals 100% by weight.

11. A solid composition, which comprises:

the position according to claim 1, as a first component, and a carrier, wherein the quantity of first component is from 10 to 50% by weight, based on the carrier, and the carrier material is selected from the group consisting of a thermoplastic polyolefin and an inorganic carrier material.

12. A process for the production of products based on thermoplastic polyolefins, comprising reacting a composition according to claim 1 with a thermoplastic polyolefin in a Monosil process.

13. The process according to claim 12, wherein the thermoplastic polyolefin and the composition, and optionally other additions, are metered into a heated screw-based extruder, the molten mixture is heated therein, the melt is conveyed and extruded by way of a die, the extrudate is passed into a water bath for crosslinking and the extrudate is permitted to react until dimensional stability is achieved and then the resultant moulding is dried.

14. A moulding, obtained by the process according to claim 12.

15. The composition according to claim 1, wherein the composition is suitable for a Monosil process for the cross linking of thermoplastic polyolefins during the production of products moulded by means of extrusion, based on thermoplastic polyolefins, where the products can be unfilled products or products filled with fillers and/or products coloured by means of dyes or by means of pigments.

16. The composition according to claim 1, wherein the content of component (ii) is from 20 to 94.95% by weight.

17. The composition according to claim 1, wherein an organotin compound is excluded.

* * * * *